United States Patent
Liang et al.

(10) Patent No.: US 9,876,756 B2
(45) Date of Patent: Jan. 23, 2018

(54) NETWORK ACCESS METHOD AND DEVICE FOR EQUIPMENT

(71) Applicant: ZTE Corporation, Shenzhen (CN)

(72) Inventors: Qiandeng Liang, Shenzhen (CN); Liang Fan, Shenzhen (CN); Bo Yuan, Shenzhen (CN)

(73) Assignee: XI'AN ZHONGXING NEW SOFTWARE CO. LTD., Xi'An (CN)

(*) Notice: Subject to any disclaimer, the term of this patent is extended or adjusted under 35 U.S.C. 154(b) by 116 days.

(21) Appl. No.: 14/890,810

(22) PCT Filed: Apr. 21, 2014

(86) PCT No.: PCT/CN2014/075851
§ 371 (c)(1),
(2) Date: Nov. 12, 2015

(87) PCT Pub. No.: WO2014/183538
PCT Pub. Date: Nov. 20, 2014

(65) Prior Publication Data
US 2016/0072762 A1 Mar. 10, 2016

(30) Foreign Application Priority Data
May 13, 2013 (CN) .......................... 2013 1 0176710

(51) Int. Cl.
*H04L 29/12* (2006.01)
*H04L 12/771* (2013.01)
(Continued)

(52) U.S. Cl.
CPC .......... *H04L 61/2015* (2013.01); *H04L 45/02* (2013.01); *H04L 45/56* (2013.01);
(Continued)

(58) Field of Classification Search
CPC .......... H04L 49/25; H04L 47/70; H04L 63/08
See application file for complete search history.

(56) References Cited

U.S. PATENT DOCUMENTS 8,693,374 B1* 4/2014 Murphy .................. H04L 12/28
370/255
9,038,151 B1* 5/2015 Chua ....................... H04L 45/02
709/223
(Continued)

FOREIGN PATENT DOCUMENTS

CN    101136946 A    3/2008
CN    101188514 A    5/2008
(Continued)

OTHER PUBLICATIONS

International Search Report for corresponding application PCT/CN2014/075851 filed Apr. 21, 2015; dated Jul. 25, 2014.
(Continued)

*Primary Examiner* — Lashonda Jacobs
(74) *Attorney, Agent, or Firm* — Cantor Colburn LLP

(57) ABSTRACT

Provided are a network access method and device for equipment. The method includes that: first equipment receives a first message, wherein the first message is used for indicating that a controller structuring and sending the first message can provide a reachable path reaching a network address allocation server; the first equipment sends a first request message to the controller according to the first message, wherein the first request message is used for requesting the controller and/or the path-reachable network address allocation server controlled by the controller to allocate a network address to the first equipment; and the first equipment accesses the network according to the allocated network address.

20 Claims, 6 Drawing Sheets

(51) Int. Cl.
*H04L 29/08* (2006.01)
*H04L 12/751* (2013.01)
*H04L 29/06* (2006.01)
*H04L 12/947* (2013.01)
*H04L 12/911* (2013.01)
*H04L 12/741* (2013.01)
*H04L 12/24* (2006.01)

(52) U.S. Cl.
CPC ........ *H04L 61/2076* (2013.01); *H04L 67/141* (2013.01); *H04L 41/0806* (2013.01); *H04L 45/74* (2013.01); *H04L 47/70* (2013.01); *H04L 49/25* (2013.01); *H04L 63/08* (2013.01); *Y02B 60/43* (2013.01)

(56) References Cited

U.S. PATENT DOCUMENTS

| | | | | |
|---|---|---|---|---|
| 9,047,416 | B2* | 6/2015 | Hidaka | G06F 13/4022 |
| 9,100,285 | B1* | 8/2015 | Choudhury | H04L 45/26 |
| 9,286,047 | B1* | 3/2016 | Avramov | G06F 8/61 |
| 9,432,255 | B1* | 8/2016 | Hasan | H04L 41/0816 |
| 9,544,389 | B2* | 1/2017 | Jeon | H04L 67/2842 |
| 9,609,574 | B2* | 3/2017 | Maria | H04W 40/24 |
| 9,647,937 | B1* | 5/2017 | Dukes | H04L 45/64 |
| 2011/0317559 | A1* | 12/2011 | Kern | H04L 45/02 370/235 |
| 2013/0268686 | A1* | 10/2013 | Wang | H04L 65/1069 709/228 |
| 2013/0329601 | A1* | 12/2013 | Yin | H04L 45/02 370/254 |
| 2014/0050223 | A1* | 2/2014 | Foo | H04L 47/2441 370/400 |
| 2014/0123211 | A1* | 5/2014 | Wanser | H04L 63/10 726/1 |
| 2014/0173018 | A1* | 6/2014 | Westphal | H04L 41/0823 709/213 |
| 2014/0229630 | A1* | 8/2014 | Narayanan | H04L 45/38 709/238 |
| 2014/0269415 | A1* | 9/2014 | Banavalikar | H04L 12/185 370/254 |
| 2015/0023210 | A1* | 1/2015 | Kis | H04L 45/563 370/254 |
| 2015/0026313 | A1* | 1/2015 | Chawla | H04L 47/24 709/220 |
| 2015/0327052 | A1* | 11/2015 | Ghai | H04W 8/18 370/328 |
| 2016/0149779 | A1* | 5/2016 | Sampath | H04L 43/0817 370/250 |

FOREIGN PATENT DOCUMENTS

| | | |
|---|---|---|
| CN | 101690132 A | 3/2010 |
| CN | 101771614 A | 7/2010 |
| CN | 102404418 A | 4/2012 |
| KR | 20020040102 A | 5/2002 |

OTHER PUBLICATIONS

Japanese Office Action Application No. 159066; dated Apr. 29, 2011; pp. 5.
"Sparc ICT-258457 Split Architechture for Large Scale Wide Area Networks", Dec. 1, 2011, XP055139597, Retrieved From the Internet: URL:HTPP;//www,FP7-Sparc,EU/Assets/Deliverables/Sparc_D3.
3_Split_Artchitecture_for_Large_Scale_Wide_Are_Networks.Pdf
Drom Bucknell University R: "Dynamic Host Configuration Protocol: RFC2131.Txt", 5.JCT-VC Meeting: 96 Mpeg Meeting: Mar. 16, 2011;(Joint Collaborative Team in Video Coding of ISO/IEC JTC1/ SC29/WG11 and ITU-T SG.16): Http: /WFTP3/ITU.INT/AV-ARC/JCTVC-Site/, Internet Engineering Task Force, IETF, CH, Mar. 1, 1997, XP015007915, pp. 46.
Sachin Sharma, et al.: "Automatic Bootstrapping of OpenFlow Networks", 2013 19th IEEE Workshop On. IEEE, Apr. 10, 2013, XP032422695; pp. 1-6.
Supplemental European Search Report Application No. EP14797993; dated Jun. 17, 2016; pp. 9.
Japanese Office Action Application No. 159066, dated Apr. 29, 2011; pp. 5.
Trema, Lan, 2013, 4, URL, https://www.slideshare.net/ssuer6d53d5/tremaday-120419.

* cited by examiner

NETWORK ACCESS METHOD AND DEVICE FOR EQUIPMENT

TECHNICAL FIELD

The present disclosure relates to the field of communication, and in particular to a network access method and device for equipment.

BACKGROUND

After development of more than forty years, the current Internet based on Transmission Control Protocol/Internet Protocol (TCP/IP) (i.e. a network communication protocol) has achieved a great success, been closely related to people's life and become one of indispensable infrastructures in work, study and life of people. The TCP/IP-based Internet initially adopts a specialization and organization principle that "a network/network equipment performs simple processing and a host (host side) performs complex processing", which causes formation of a current situation of a current Internet system structure: an application layer protocol on the host side may are conveniently and flexibly modified and deployed, so that the software in the application layer is developed rapidly, and functions of an application layer are greatly enriched; and a network layer forms sharp contrast with the application layer, and a network layer protocol is simple in design, poor in extensibility and difficult to modify. Thus, the following problems are caused:

on one hand, many fatal bugs of the network layer of the Internet are unlikely to be repaired and improved for a long time, for example: network management is difficult to deploy, network security problems become more and more serious, it is difficult to provide quality of service for a user by a best-effort forwarding strategy, and multicast is difficult to deploy and use; and on the other hand, new protocols and new applications making revolution requirements on the network layer are difficult to implement, for example: it is relatively difficult to transit Internet Protocol version 4 (IPv4) to IPv6, access equipment increasingly challenges network reliability and differentiated service capability in terms of mobility and heterogeneity, routing is confronted with a problem about extensibility under a large-scale network condition, applications such as cloud computation and content delivery makes new requirements on network forwarding efficiency, and Vinton G Cerf, father of TCP/IP, also points out that the Internet should be better in terms of network security and network reliability ("security and reliability are the two most basic thresholds for advancing to the future Internet, otherwise the architecture may not survive"). Therefore, the Internet forms the situation that "the application network is flexible and variable, but the network layer stiff, difficult to change and full of bugs" at present. In order to solve the current problems and difficult situation of the Internet, deep discussion, researches and innovation from layers such as the network system structure and a control layer are required.

For how to solve the problems of challenges with which the current Internet is confronted, domestic and international research institutes make a lot of active exploration and researches from the Internet system structure layer. The Internet is developed mainly in two stages, and improvement in the Internet may be divided into two: evolution improvement and revolution improvement.

For many years, many problems about quality of serving guarantee, mobility support, high efficiency, reliability, security guarantee and the like of a conventional IP network are exposed, these problems are respectively solved by designing pertinent repair manners in the field of researches, and weaknesses or errors of a running network are immediately improved once being discovered, for example: a new protocol and functional component and the like are added in a conventional Internet system structure. Such a "repair->problem discovery->modification" improvement manner, the existing network is gradually evolved and developed on the basis of an existing TCP/IP system structure of the Internet, and new functions and characteristics are added to solve the current problems; and such a manner is an evolution improvement manner. Such an improvement manner has the advantages of easiness in deployment and implementation and favourability for protecting the existing input in the conventional Internet construction. However, the manner has main shortcomings as follows: 1) only local problems are solved within a small range by certain repair; 2) existing improvement may create benefits in a short period, but is destructive for a long time, for example: a Network Address Translation (NAT) technology is locally beneficial but integrally destructive; 3) certain repair may be unlikely to be "compatible" with continuous modification in the future; 4) after multiple repair, the Internet becomes "heavier and heavier" and more and more complex, flexibility is reduced, and bearing capacity of an originally-designed simple system structure of the Internet is exceeded; and 5) some inherent problems in the conventional Internet system structure are unlikely to be radically solved. At present, the Internet is gradually improved mainly in the "evolution" manner.

Since 2005, another point of view is gradually formed in the field of researches, the problems with which the IP network is confronted may be radically solved only by redesigning the network system structure, now is a good time for completely revolving the Internet system structure "Clean-Slate", the existing Internet system structure is completely abandoned, and a new-generation Internet system structure integrating multiple design targets is designed. Such a solution aims to radically solve various problems of the existing Internet system structure, and is a revolution improvement solution. Such a solution has the advantages that: 1) leash of a TPC/IP system structure can be slipped, and constraints and framework of the system structure can be broken to solve left problems caused by the system structure of the Internet over many years; and 2) the Internet can be completely redesigned, many problems of the Internet can be overall solved, and many new requirements of the Internet can be overall met. However, the solution has the shortcomings that: 1) the completely new network may not be compatible with the existing Internet, and infrastructure of the existing Internet is required to be completely replaced, so that problems about network deployment and smooth transition exist; 2) there are great risks in how to establish a new system structure and whether problems with which the Internet is confronted at present and to be confronted in the future can be solved or not after the new system structure is established; and 3) it is necessary to reconstruct a test network suitable for the completely new system structure, so that evolution cost is higher.

In order to solve the problems of the current Internet and rapidly and flexibly deploy a new network protocol, an open programmable network is proposed, and the open programmable network refers to allowing a network researcher, besides an equipment manufacturer, to perform program on network equipment and manage a network system structure or network protocol. The open programmable network is one of representative achievements of the revolution improvement solution, and it may substantially be summarized as follows: an original integrated and complex Metropolitan Area Network (MAN) or Wide Area Network (WAN) or network equipment with multiple coexisting functional networks is functionally segmented, for example, into a data forwarding part and a logic control part, or a system core part and a user function part, and the like. An interface between each part is open and standard. On the basis of the open and standard interface, each part may be independently evolved and improved without notifying or influencing the other parts, so that the whole network or network equipment may be independently and smoothly evolved and improved. The open programmable network faces challenges as follows: 1) network layers are required to have certain reasonability, scientificity and extensibility; 2) scientific and extensible interlayer interfaces are defined; and 3) if a centralized control manner is adopted for the control layer, it is necessary to consider inter-area connection, extensibility (for example: global extension) and the like.

In terms of researches on an open programmable network, technologies such as a Software Defined Networking (SDN) technology proposed by Scott Shenker and the like in Berkeley University and OpenFlow (OpenFlow is a novel network switching model proposed by the revolution group) of Stanford University are representative achievements of open network researches. FIG. 1 is a topology diagram of an SDN/OpenFlow network, wherein the SDN/OpenFlow network includes three layers: an infrastructure layer, a network control layer and an application layer. The infrastructure layer of the SDN/OpenFlow network consists of each piece of forwarding equipment, and the forwarding equipment is simpler and free of a complex control plane compared with a router, switch and each gateway in a current network, and mainly works to forward a data stream. Main equipment of the network control layer is a network operating system (or called an SDN/OpenFlow controller), the network operating system simultaneously controls multiple pieces of forwarding equipment instead of an original independent control plane in each piece of equipment and even a current network management system through standard interfaces, and may implement network management and end-to-end data stream rule transmission (that is, a stream rule is transmitted to multiple pieces of forwarding equipment on a forwarding path), and in addition, the network operating system interacts with the application layer through an Application Programming Interface (API). The application layer consists of different applications, and the applications may directly call a network management and control function of the control layer through the API.

Like a deployment of another revolution improvement technology, an operator network inevitably encounters many problems in a process of evolution to an SDN/OpenFlow architecture, extensibility mentioned above is one of the most important problems, but network deployment flexibility is an important index for balancing the extensibility of the network. In a current SDN/OpenFlow network, network control layer equipment (for example: a controller) and infrastructure layer equipment (i.e. forwarding equipment) interact with each other through an IP-address-based communication protocol message (for example: OpenFlow protocol), and IP addresses of the controller and the forwarding equipment are both preconfigured, which are unfavourable for large-scale rapid deployment of the forwarding equipment and subsequent flexible addition and reduction of the forwarding equipment. For the problems, there is yet no effective solution.

SUMMARY

The embodiment of the present disclosure provides a network access method and device for equipment, so as to solve the technical problem that equipment unconfigured with a network address may not effectively access a network and network deployment and data forwarding flexibility is lower due to the fact that network addresses of equipment are preconfigured in a related art.

According to one aspect of an embodiment of the present disclosure, a network access method for equipment is provided, which includes that: first equipment receives a first message, wherein the first message is used for indicating that a controller structuring and sending the first message can provide a reachable path reaching a network address allocation server; the first equipment sends a first request message to the controller according to the first message, wherein the first request message is used for requesting the controller and/or the path-reachable network address allocation server controlled by the controller to allocate a network address to the first equipment; and the first equipment accesses the network according to the allocated network address.

Preferably, the first message contains related information of the controller, wherein the related information of the controller includes at least one piece of the following information: a network address of the controller, an equipment identifier of the controller and a management domain name of the controller.

Preferably, after the network address is allocated to the first equipment, the method further includes that: the first equipment establishes a connection with the controller; and the first equipment forwards the first message structured and transmitted by the controller to one or more pieces of second equipment directly connected to the first equipment.

Preferably, after the first equipment forwards the first message structured and transmitted by the controller to the one or more pieces of second equipment directly connected to the first equipment, the method further includes that: the second equipment sends a second request message to the first equipment according to the first message, wherein the second request message is used for requesting the controller and/or the path-reachable network address allocation server controlled by the controller to allocate a network address to the second equipment; and the first equipment forwards the second request message to the controller.

Preferably, the step that the first equipment sends the first request message to the controller includes that: the first equipment judges whether it has been configured with the network address or not; and under the condition that a judgment result is NO, the first equipment sends the first request message to the controller.

Preferably, the one or more pieces of second equipment are equipment, except equipment in a source direction of the first message, in equipment directly connected to the first equipment.

Preferably, the controller sends the first message periodically and/or the controller generates and sends the first message according to a requirement.

Preferably, after the first equipment sends the first request message to the controller according to the first message, and acquires the network address, the method further includes that: the first equipment establishes an SDN connection or an OpenFlow connection with the controller according to the allocated network address, wherein the controller includes: an SDN controller and/or an SDN configuration point.

Preferably, after the step that the first equipment establishes the SDN connection or the OpenFlow connection with the controller according to the allocated network address, the method further includes that: the controller sends an SDN control message and/or an OpenFlow control message to the first equipment, wherein the SDN control message and/or the OpenFlow control message contain/contains a forwarding rule for forwarding a Dynamic Host Configure Protocol (DHCP) discover message and a DHCP request message and/or a forwarding rule for forwarding an OpenFlow protocol message.

Preferably, the step that the controller sends the SDN control message and/or the OpenFlow control message to the first equipment includes that: the controller directly sends the SDN control message and/or the OpenFlow control message to the first equipment; or the controller sends the SDN control message and/or the OpenFlow control message to the first equipment after receiving a query message containing the DHCP message from the first equipment.

Preferably, the step that the controller allocates the network address to the first equipment includes that: the first equipment and the controller implement the allocation of the network address through the DHCP message, wherein the first request message is born in the DHCP message.

Preferably, the step that the first equipment establishes the SDN connection or the OpenFlow connection with the controller according to the allocated network address includes that: the first equipment establishes the SDN connection or the OpenFlow connection according to the allocated network address and the network address of the controller under the condition that the controller contains the network address of the controller for establishing the SDN connection or the OpenFlow connection in the DHCP message; or the first equipment establishes the SDN connection or the OpenFlow connection according to the allocated network address and the network address of the controller acquired from the first message under the condition that the controller does not contain the network address of the controller for establishing the SDN connection or the OpenFlow connection in the DHCP message.

Preferably, the step that the controller allocates the network address to the first equipment includes that: the controller performs DHCP message interaction with the first equipment to implement the allocation of the network address through a DHCP server function, wherein the path-reachable network address allocation server includes: a DHCP server; or the controller participates in DHCP message interaction between the first equipment and DHCP server equipment to implement the allocation of the network address through a DHCP relay function.

Preferably, the first message includes: a Link Layer Discovery Protocol (LLDP) message.

Preferably, the first message contains a plug-and-play capability attribute, wherein the capability attribute is used for indicating the reachable path where the controller can provide the network address allocation server and provide the related information of the controller.

Preferably, the capability attribute includes at least one of the followings: an attribute indicating whether the controller can provide DHCP address allocation or not, an attribute indicating whether the controller can support DHCP relay, the network address of the controller, the equipment identifier of the controller and the management domain name of the controller.

According to the other aspect of the embodiment of the present disclosure, a network access device for equipment is provided, which is located in first equipment and includes: a receiving element configured to receive a first message, wherein the first message is used for indicating that a controller structuring and sending the first message can provide a reachable path reaching a network address allocation server; a first sending element configured to send a first request message to the controller according to the first message, wherein the first request message is used for requesting the controller and/or the path-reachable network address allocation server controlled by the controller to allocate a network address to the first equipment; and an access element configured to enable the first equipment to access the network according to the allocated network address.

Preferably, the device further includes: a first establishment element configured to establish a connection with the controller; and a second sending element, configured to forward the first message structured and transmitted by the controller to one or more pieces of second equipment directly connected with the first equipment.

Preferably, the first sending element includes: a judgment component, configured to judge whether it has been configured with the network address or not; and a sending component configured to, under the condition that a judgment result is NO, send the first request message to the controller.

Preferably, the device further includes: a second establishment element, configured to establish an SDN connection or an OpenFlow connection with the controller according to the allocated network address, wherein the controller includes: an SDN controller and/or an SDN configuration point.

According to the embodiments of the present disclosure, the first message is used for indicating that the controller sending the first message can provide the reachable path reaching the network address allocation server, and the reachable path indicates that the first equipment can access the network through the controller. The first equipment may learn about that the network may be accessed through the controller after receiving the message, and then the first equipment may send the request message to the controller to request for network address allocation and access the network. In such a manner, the technical problem that equipment unconfigured with a network address may not effectively access the network and network deployment and data forwarding flexibility is lower due to the fact that network addresses of equipment are preconfigured in the related art is solved, and the technical effect that the equipment effectively accesses the network without setting a control plane network is achieved.

BRIEF DESCRIPTION OF THE DRAWINGS

The drawings described here are adopted to provide further understanding of the present disclosure, and form a part of the present disclosure. Schematic embodiments of the present disclosure and description thereof are adopted to explain the present disclosure and not intended to form improper limits to the present disclosure. In the drawings.

DETAILED DESCRIPTION OF THE EMBODIMENTS

The present disclosure is described below with reference to the drawings and embodiments in detail. It is important to note that the embodiments in the present disclosure and characteristics in the embodiments can be combined under the condition of no conflicts.

Figure 1:
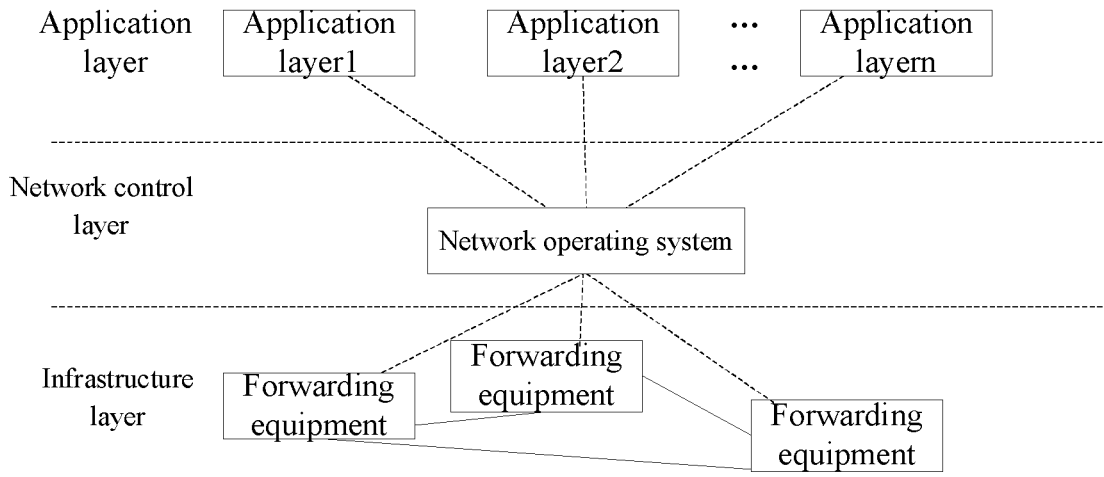
FIG. 1 is a topology diagram of an SDN/OpenFlow network according to the prior art.
Figure 2:
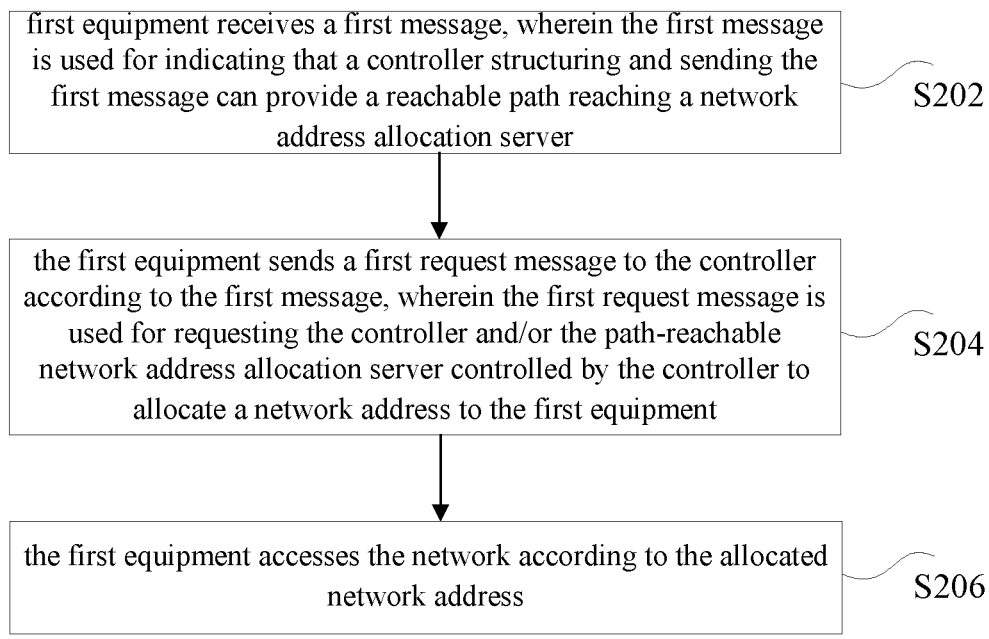
FIG. 2 is a preferred flowchart of a network access method for equipment according to an embodiment of the present disclosure.

The embodiment of the present disclosure provides a preferred network access method for equipment, and as shown in FIG. 2, the method includes the following steps:

Step 202: first equipment receives a first message, wherein the first message is used for indicating that a controller structuring and sending the first message can provide a reachable path reaching a network address allocation server;

Step 204: the first equipment sends a first request message to the controller according to the first message, wherein the first request message is used for requesting the controller and/or the path-reachable network address allocation server controlled by the controller to allocate a network address to the first equipment; and Step 206: the first equipment accesses the network according to the allocated network address.

In the preferred implementation above, the first message is used for indicating that the controller sending the first message can provide the reachable path reaching the network address allocation server, and the reachable path indicates that the first equipment can access the network through the controller. The first equipment may learn about that the network may be accessed through the controller after receiving the first message, and then the first equipment may send the request message to the controller to request for network address allocation and access the network. In such a manner, the technical problem that equipment unconfigured with a network address may not effectively access the network and network deployment and data forwarding flexibility is lower due to the fact that network addresses of equipment are preconfigured in the related art is solved, and the technical effect that the equipment effectively accesses the network without setting a control plane network is achieved.

Preferably, indicating that the controller structuring and sending the first message can provide the reachable path reaching the network address allocation server refers to that the controller can allocate the network address to the first equipment, and a specific allocation manner may be that the network address is allocated by the server, and may also be that the network address is allocated by the network address allocation server within the control range of the controller. Providing the reachable path means that the controller can establish a connection with the server capable of performing address allocation, and the server capable of performing address allocation may be the controller, and may also be an address allocation server controlled by the controller. The first message may be actively triggered to be generated by the controller, and is used for triggering network access of equipment directly connected with the controller.

The first message contains related information of the controller, wherein the related information of the controller may include, but not limited to, at least one piece of the following information: a network address of the controller, an equipment identifier of the controller and a management domain name of the controller.

After Step 202, no matter whether the network address is allocated by the controller or the network address has been configured, the first equipment may establish a connection with the controller through the corresponding network address, namely accesses the network. The first equipment may be plug-and-play equipment, that is, the first equipment may establish the connection with the network only after being plugged, so that the first equipment is within the control range of the controller. After the first equipment establishes the connection with the controller, the controller may sends the first message structured and transmitted by the controller to one or more pieces of second equipment directly connected to the first equipment through the first equipment, and then sends the first message to third equipment directly connected to the second equipment through the second equipment to realize layer-by-layer spreading, so that the equipment which is not directly connected to the controller in the network may effectively access the network. In such a manner, network addresses can be effectively allocated to all the equipment in the network. In a preferred implementation, after the network address is allocated to the first equipment, the method further includes that: the first equipment establishes the connection with the controller; and the first equipment forwards the first message structured and transmitted by the controller to one or more pieces of second equipment directly connected to the first equipment.

After the first equipment forwards the first message structured and transmitted by the controller to the one or more pieces of second equipment directly connected with the first equipment, the method further includes that: the second equipment sends a second request message to the first equipment according to the first message, wherein the second request message is used for requesting the controller and/or the path-reachable network address allocation server controlled by the controller to allocate a network address to the second equipment; and the first equipment forwards the second request message to the controller. In the process, physical connection angles are mainly considered, the controller is connected to the first equipment, the first equipment is connected to the second equipment, and the request message of the second equipment can reach the controller only after being forwarded by the first equipment.

In order to resource waste caused by address reallocation for the first equipment which has been allocated with the address in response to the first message, in a preferred implementation, the step that the first equipment sends the first request message to the controller includes that: the first equipment judges whether it has been configured with a network address or not; and under the condition that a judgment result is NO, the first equipment sends the first request message to the controller. That is, only under the condition that the first equipment is not configured with the corresponding network address, the first equipment may send the first request message to the controller to request the controller to allocate the network address or to request the path-reachable network address allocation server controlled by the controller to allocate the network address.

In the process that the first equipment sends the first message to the one or more pieces of second equipment connected to the first equipment, the second equipment is equipment, except equipment located in a source direction sending out the first message, in equipment directly connected to the first equipment. Therefore, the message is prevented from being repeatedly sent to the same equipment for many times.

Preferably, the controller may generate and send the first message periodically and/or according to a requirement.

After Step 204 and after the first equipment acquires the network address, the method further includes that: the first equipment establishes an SDN connection or an OpenFlow connection with the controller according to the allocated network address. The controller may include: an SDN controller. Preferably, the first equipment may include: SDN forwarding equipment or OpenFlow forwarding equipment.

Preferably, after the first equipment establishes the SDN connection or the OpenFlow connection with the controller according to the allocated network address, the method further includes that: the controller sends an SDN control message and/or an OpenFlow control message to the first equipment, wherein the SDN control message and/or the OpenFlow control message may contain a forwarding rule for forwarding a DHCP discover message and a DHCP request message, and may also contain a forwarding rule for forwarding an OpenFlow protocol message.

In a preferred implementation, the controller sends the SDN control message and/or the OpenFlow control message to the first equipment may include that: the controller directly sends the SDN control message and/or the OpenFlow control message to the first equipment; or the controller sends the SDN control message and/or the OpenFlow control message to the first equipment after receiving a query message containing the DHCP message from the first equipment.

In order to implement the allocation of the network address (for example: an IP address), the network address may be allocated through the DHCP message, wherein the first request message may also be borne in the DHCP message.

The step that the first equipment establishes the SDN connection or the OpenFlow connection with the controller according to the allocated network address may include that: the first equipment establishes the SDN connection or the OpenFlow connection according to the allocated network address and the network address of the controller under the condition that the controller contains the network address (it may also be a private network address) of the controller for establishing the SDN connection or the OpenFlow connection in the DHCP message; or the first equipment establishes the SDN connection or the OpenFlow connection according to the allocated network address and the network address of the controller acquired from the first message under the condition that the network address of the controller for establishing the SDN connection or the OpenFlow connection is not contained in the DHCP message by the controller.

During a practical application, the controller may have a function of a DHCP server, and may also be configured with a relay capability. In a preferred implementation, the step that the controller allocates the network address to the first equipment may include that: the controller performs, using the function of the DHCP server, DHCP message interaction with the first equipment to implement the allocation of the network address; or the controller participates, using a DHCP relay function, in DHCP message interaction between the first equipment and DHCP server equipment to implement the allocation of the network address.

In each preferred implementation, the first message may include: an LLDP message. That is, in the preferred embodiment, the LLDP message is extended, so that the LLDP message may indicate that the controller can provide the reachable path reaching the network address allocation server as well as the related information of the controller. Preferably, an attribute indicating that the controller can provide the reachable path reaching the network address allocation server may be a plug-and-play capability attribute, that is, the plug-and-play capability attribute is contained in the first message to indicate that the controller can provide the reachable path reaching the network address allocation server and provide the related information of the controller. Preferably, the capability attribute may include, but not limited to, at least one of: information about whether the controller can provide DHCP address allocation or not, information about whether the controller can support DHCP relay, the network address of the controller, the equipment identifier of the controller and the management domain name of the controller.

It is important to note that the first equipment establishes the connection with the controller in each preferred implementation, which is equivalent to the access of the first equipment to the network according to the allocated network address in Step 206.

Figure 3:
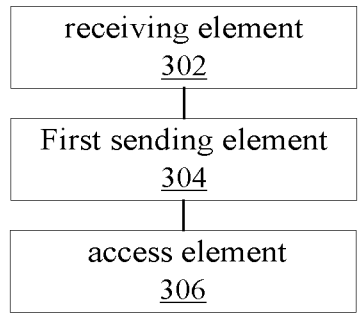
FIG. 3 is a preferred structure diagram of a network access device for equipment according to an embodiment.

One embodiment further provides a network access device for equipment, which is located in first equipment. The first equipment may preferably be forwarding equipment. The device is configured to implement the embodiment and preferred implementation, and that what has been described will not be repeated. A term "element" or "component", used below, is a combination of software and/or hardware capable of realizing preset functions. The device described in the following embodiment is preferably implemented by software, but the implementation of the device with hardware or the combination of software and hardware is also possible and conceived. FIG. 3 is a preferred structure diagram of a network access device for equipment according to an embodiment of the present disclosure, and as shown in FIG. 3, the device includes: a receiving element 302, a first sending element 304 and an access element 306. The structure is described below.

The receiving element 302 is configured to receive a first message, wherein the first message is used for indicating that a controller structuring and sending the first message can provide a reachable path reaching a network address allocation server, the first message may also contain related information of the controller preferably, and the related information of the controller includes at least one piece of the following information: a network address of the controller, an equipment identifier of the controller and a management domain name of the controller.

The first sending element 304 is coupled with the receiving element 302, and is configured to send a first request message to the controller according to the first message, wherein the first request message is used for requesting the controller and/or the path-reachable network address allocation server controlled by the controller to allocate a network address to the first equipment.

The access element 306 is coupled with the first sending element 304, and is configured to enable the first equipment to access the network according to the allocated network address.

Figure 4:
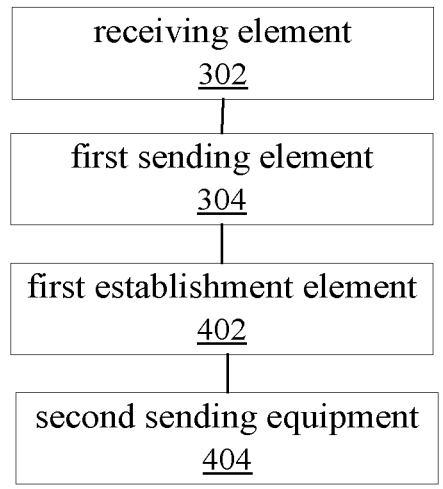
FIG. 4 is another preferred structure diagram of a network access device for equipment according to an embodiment.

In a preferred implementation, as shown in FIG. 4, the device further includes: a first establishment element 402 configured to establish a connection with the controller after the network address is allocated to the first equipment; and a second sending element 404 coupled with the first establishment element 402 and configured to forward the first message structured and transmitted by the controller to one or more pieces of second equipment directly connected to the first equipment.

Preferably, the device further includes: a forwarding element configured to forward a second request message, which is sent by the one or more pieces of second equipment and is in response to the first message, to the controller, wherein the second request message is used for requesting the controller and/or the path-reachable network address allocation server controlled by the controller to allocate a network address to the second equipment.

Figure 5:
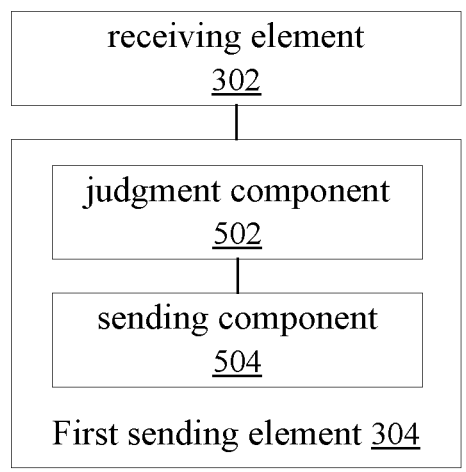
FIG. 5 is another preferred structure diagram of a network access device for equipment according to an embodiment.

In a preferred implementation, as shown in FIG. 5, the first sending element 304 includes: a judgment component 502 configured to judge whether it has been configured with the network address or not; and a sending component 504 coupled with the judgment component 502 and configured to, under the condition that a judgment result is NO, send the first request message to the controller.

In a preferred implementation, the device further includes: a second establishment element configured to establish an SDN connection or an OpenFlow connection with the controller according to the allocated network address, wherein the controller includes: an SDN controller.

In a preferred implementation, the controller further includes: a third sending element configured to send an SDN control message and/or an OpenFlow control message to the first equipment after the first equipment establishes the SDN connection or the OpenFlow connection with the controller according to the allocated network address, wherein the SDN control message and/or the OpenFlow control message contain/contains a forwarding rule for forwarding a DHCP discover message and a DHCP request message and/or a forwarding rule for forwarding an OpenFlow protocol message.

Preferably, the third sending element includes: a first sending component configured to directly send the SDN control message and/or the OpenF low control message to the first equipment; or a second sending component configured to send the SDN control message and/or the OpenFlow control message to the first equipment after receiving a query message containing the DHCP message from the first equipment.

Preferably, that the sending party allocates the network address to the first equipment includes that: the first equipment and the sending party implement the allocation of the network address through the DHCP message, wherein the first request message is borne in the DHCP message.

Preferably, the second establishment element includes: a first establishment component configured to establish the SDN connection or the OpenFlow connection according to the allocated network address and the network address of the controller under the condition that the the network address of the controller for establishing the SDN connection or the OpenFlow connection is contained in the DHCP message by the controller; or a second establishment component configured to establish the SDN connection or the OpenFlow connection according to the allocated network address and the network address of the controller acquired from the first message under the condition that the network address of the controller for establishing the SDN connection or the Open-Flow connection is not contained in the DHCP message by the controller.

Preferably, that the controller allocates the network address to the first equipment includes that: the controller performs DHCP message interaction with the first equipment to implement the allocation of the network address through a DHCP server function; or the controller participates in DHCP message interaction between the first equipment and DHCP server equipment to implement the allocation of the network address through a DHCP relay function.

Description will be given below by taking forwarding equipment as the first equipment and taking an SDN controller as the controller, and in the preferred implementation, a plug-and-play method and system for SDN forwarding equipment are provided. An SDN or OpenFlow network controller sends an extended LLDP message to the forwarding equipment, the forwarding equipment which has been configured with a network address (IP address) forwards the extended LLDP message to other forwarding equipment directly connected to the forwarding equipment, and then the forwarding equipment which has not been configured with an IP address performs DHCP message interaction with the network controller to implement the IP address configuration of the forwarding equipment. By the method, a plug-and-play function of the forwarding equipment of an SDN/OpenFlow network is realized, a deployment speed of a large-scale SDN/OpenFlow network is further increased, deployment flexibility of the forwarding equipment is improved, and extensibility of the SDN/OpenFlow network is improved.

Figure 6:
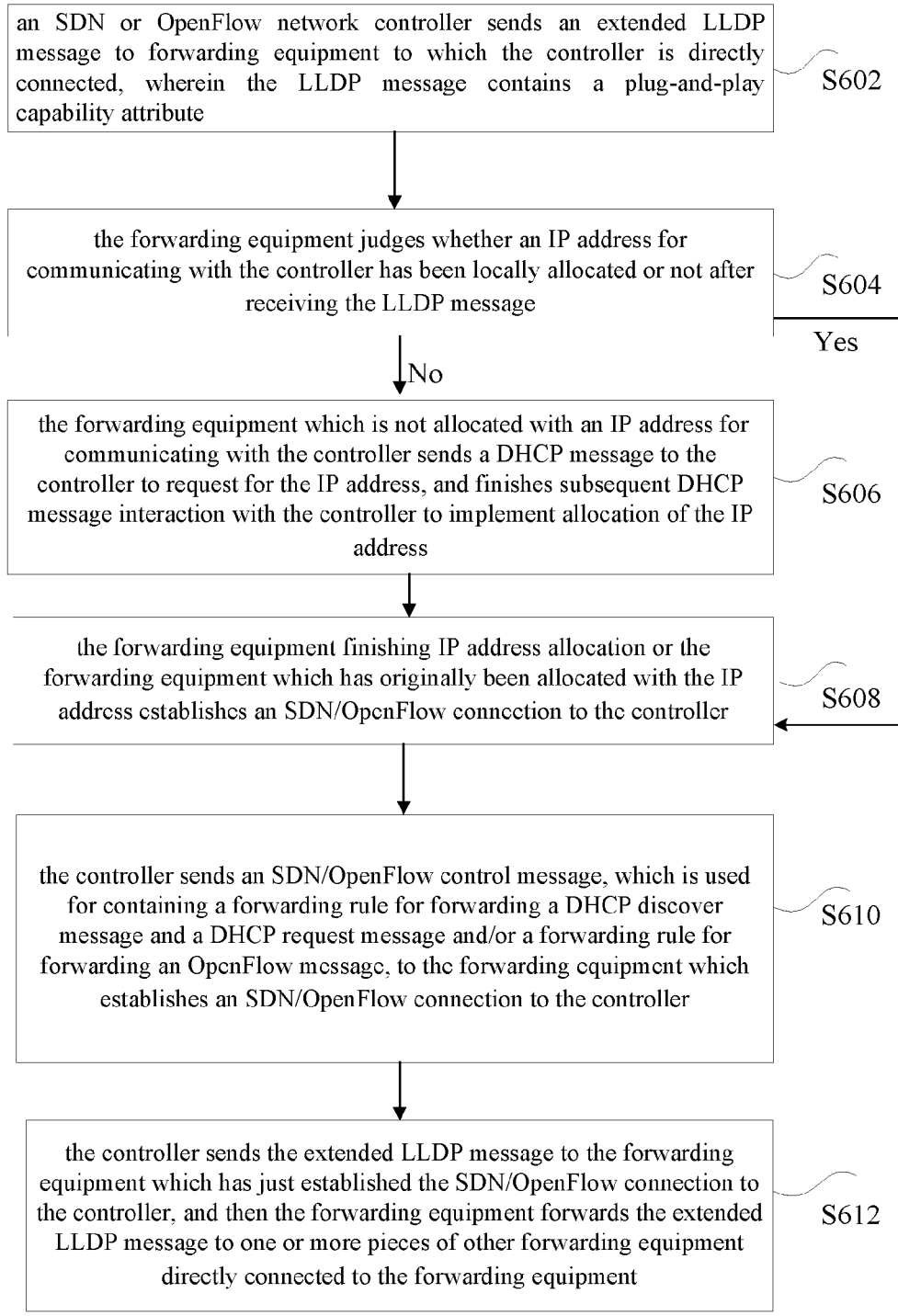
FIG. 6 is a preferred flowchart according to an embodiment of the present disclosure.

As shown in FIG. 6, the method specifically includes the following steps:

Step 602: an SDN or OpenFlow network controller sends an extended LLDP message to forwarding equipment to which the controller is directly connected, wherein the LLDP message contains a plug-and-play capability attribute.

Preferably, the controller sends the LLDP message periodically or according to a requirement. The plug-and-play capability attribute indicates that the controller has a function of a DHCP address allocation or DHCP relay. The plug-and-play capability attribute of the SDN or OpenFlow network controller may further include: a domain name of a management domain to which the equipment belongs. Therefore, domain-based deployment and management of an SDN or OpenFlow network are implemented, and system deployment flexibility is improved.

Step 604: the forwarding equipment judges whether an IP address for communicating with the controller has been locally allocated or not after receiving the LLDP message, Step 608 is executed if the IP address has been allocated, otherwise Step 606 is executed.

Step 606: the forwarding equipment which is not allocated with an IP address for communicating with the controller sends a DHCP message to the controller to request for the IP address, and finishes subsequent DHCP message interaction with the controller to implement allocation of the IP address.

Preferably, the controller performs, by using its DHCP server function, DHCP message interaction with the forwarding equipment to implement the allocation of the IP address to the forwarding equipment, or the controller participates, by using its DHCP relay function, in DHCP message interaction between the forwarding equipment and DHCP server equipment to implement the allocation of the IP address to the forwarding equipment.

Step 608: the forwarding equipment finishing IP address allocation or the forwarding equipment which has originally been allocated with the IP address establishes an SDN/OpenFlow connection to the controller.

Preferably, the forwarding equipment establishes the SDN/OpenFlow connection by virtue of the allocated IP address and the IP address of the controller if an IP address (i.e. the network address mentioned before) of the controller for establishing the SDN/OpenFlow connection is contained in the DHCP message by the controller, or the forwarding equipment establishes the SDN/OpenFlow connection by virtue of the allocated IP address and an address of DHCP server or DHCP relay equipment if the controller does not contain the IP address of the controller for establishing the SDN/OpenFlow connection in the DHCP message.

Step 610: the controller sends an SDN/OpenFlow control message, which is used for containing a forwarding rule for forwarding a DHCP discover message and a DHCP request message and/or a forwarding rule for forwarding an OpenFlow message, to the forwarding equipment which establishes an SDN/OpenFlow connection to the controller.

Preferably, the controller directly sends the control message to the forwarding equipment after the SDN/OpenFlow connection is established, or the controller sends the control message to the forwarding equipment after receiving a query message containing the DHCP message from the forwarding equipment.

Step 612: the controller sends the extended LLDP message to the forwarding equipment which has just established the SDN/OpenFlow connection to the controller, and then the forwarding equipment forwards the extended LLDP message to one or more pieces of other forwarding equipment directly connected to the forwarding equipment.

Preferably, the forwarding equipment is required not to send the LLDP message to the equipment which is located in the direction where the LLDP message is sent, that is, the other forwarding equipment is all forwarding equipment, except forwarding equipment in a source direction of the extended LLDP message, directly connected to the forwarding equipment.

Three embodiments of the present disclosure in different application scenarios are specifically introduced below respectively.

Preferred Implementation I

Figure 7:
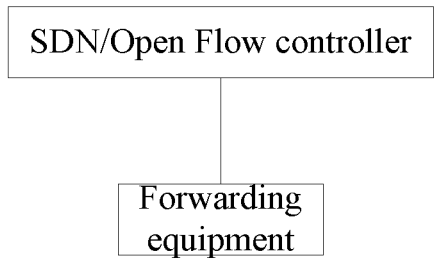
FIG. 7 is a network topology diagram according to preferred implementation I of an embodiment of the present disclosure.
Figure 8:
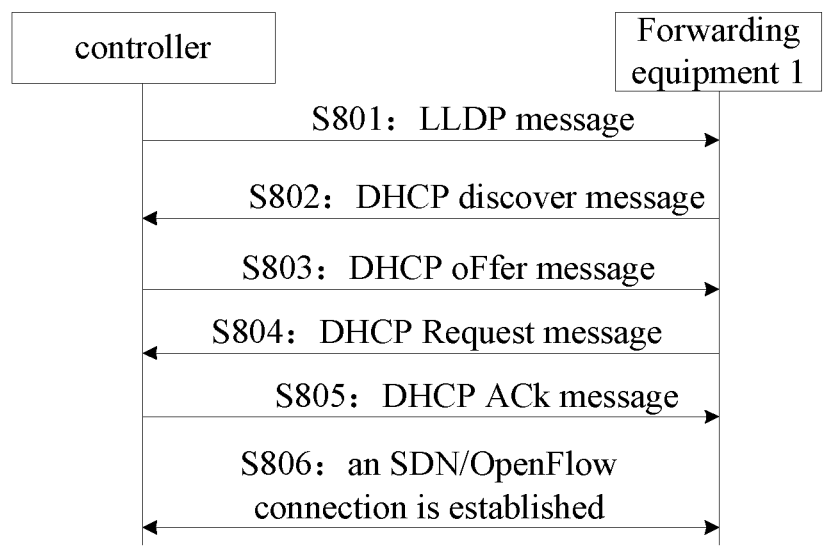
FIG. 8 is a flowchart according to preferred implementation I of an embodiment of the present disclosure.

In the preferred implementation, an SDN/OpenFlow controller is taken as a DHCP server, and allocates an IP address to the forwarding equipment to which the SDN/OpenFlow controller is connected directly. FIG. 7 is a networking diagram, the controller is the SDN/OpenFlow controller, and forwarding equipment 1 is SDN/OpenFlow forwarding equipment. As shown in FIG. 8, the flow specifically includes:

Step 801: a controller sends an extended LLDP message to forwarding equipment 1, wherein the extended LLDP message contains a plug-and-play capability attribute; and preferably, the controller sends the LLDP message periodically or according to a requirement, and the plug-and-play capability attribute indicates that the controller can provide a DHCP address allocation function.

Step 802: if the forwarding equipment 1 determines that an IP address for communicating to the controller is not locally allocated after receiving the LLDP message, the forwarding equipment 1 sends a DHCP discover message to the controller. Preferably the forwarding equipment 1 sends the DHCP discover message via an interface receiving the LLDP message.

Step 803: the controller sends a DHCP offer message to the forwarding equipment 1 after receiving the DHCP discover message.

Step 804: the forwarding equipment 1 sends a DHCP request message to the controller after receiving the DHCP offer message.

Step 805: the controller sends a DHCP Acknowledgement (Ack) message to the forwarding equipment 1 after receiving the DHCP request message, thereby finishing allocation of the IP address to the forwarding equipment 1. Preferably, the controller contains an IP address of the controller for establishing an SDN/OpenFlow connection in the DHCP message.

Step 806: the forwarding equipment 1 establishes the SDN/OpenFlow connection to the controller. Preferably, the forwarding equipment 1 establishes the SDN/OpenFlow connection by virtue of the allocated IP address and the IP address of the controller if the IP address of the controller for establishing the SDN/OpenFlow connection is contained in the DHCP message by the controller or a DHCP server. The forwarding equipment 1 establishes the SDN/OpenFlow connection by virtue of the allocated IP address and the IP address of the controller which is contained in the capability attribute of the extended LLDP message if t the IP address of the controller for establishing the SDN/OpenFlow connection is not contained in the DHCP message by the controller or the DHCP server. Preferably, the controller directly sends a forwarding rule for forwarding the DHCP discover message and the DHCP request message and/or a forwarding rule for forwarding an OpenFlow protocol message to the forwarding equipment 1 after the controller establishes the SDN/OpenFlow connection with the forwarding equipment 1, and the forwarding equipment 1 forwards the extended LLDP message to forwarding equipment externally connected with an edge of an SDN.

Preferred Implementation II

Figure 9:
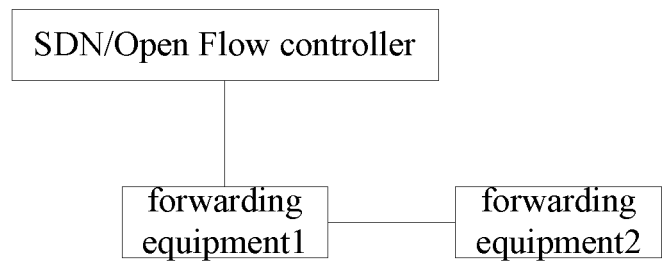
FIG. 9 is a network topology diagram according to preferred implementation II of an embodiment of the present disclosure.
Figure 10:
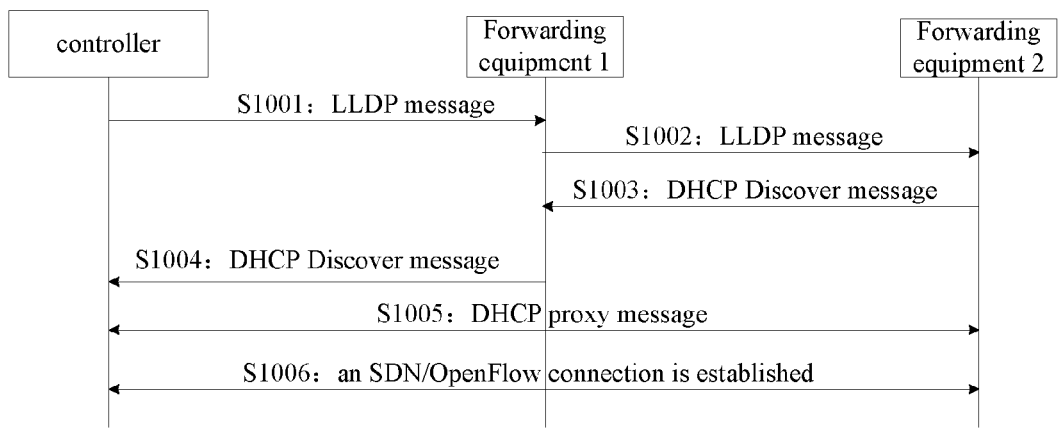
FIG. 10 is a flowchart according to preferred implementation II of an embodiment of the present disclosure.

In a preferred implementation, an SDN/OpenFlow controller is taken as a DHCP server, and allocates an IP address to forwarding equipment which is not directly connected to the SDN/OpenFlow controller. FIG. 9 is a networking diagram, the controller is the SDN/OpenFlow controller, the forwarding equipment 1 is SDN/OpenFlow forwarding equipment directly connected to the controller, and forwarding equipment 2 is SDN/OpenFlow forwarding equipment which is not directly connected to the controller. As shown in FIG. 10, the flow specifically includes:

Step 1001: a controller sends an extended LLDP message to the forwarding equipment 1, wherein the extended LLDP message contains a plug-and-play capability attribute; preferably, the controller sends the LLDP message periodically or according to a requirement; and the plug-and-play capability attribute indicates that the controller can provide a DHCP address allocation function.

Step 1002: after receiving the LLDP message, the forwarding equipment 1 forwards the LLDP message to the forwarding equipment 2 which is directly connected to the forwarding equipment 1. Preferably, the forwarding equipment 1 is not required to send the LLDP message to the equipment located in a direction where the extended LLDP message is sent. Preferably, the forwarding equipment 1 forwards the LLDP message to other forwarding equipment which is directly connected to the forwarding equipment 1, and the other forwarding equipment is all forwarding equipment, except the forwarding equipment in a source direction of the extended LLDP message, directly connected to the forwarding equipment 1, and includes the forwarding equipment 2.

Step 1003: after receiving the LLDP message, the forwarding equipment 2 determines that an IP address for communicating with the controller is not locally allocated, and the forwarding equipment 2 sends a DHCP discover message to the controller. Preferably, the forwarding equipment 2 sends the DHCP discover message via an interface receiving the LLDP message.

Step 1004: the forwarding equipment 1 sends the DHCP discover message to the controller after receiving the DHCP discover message. Preferably, the forwarding equipment 1 forwards the DHCP discover message according to a forwarding rule sent to the forwarding equipment 1 in advance by the controller, or the forwarding equipment 1 forwards the DHCP discover message according to the forwarding rule sent to the forwarding equipment 1 by the controller after the forwarding equipment 1 request the controller for the forwarding rule.

Step 1005: after receiving the DHCP discover message, the controller performs subsequent DHCP message interaction with the forwarding equipment 2 to implement allocation of the IP address to the forwarding equipment 2. Preferably, the forwarding equipment 2 may forward the subsequent message interacted between the forwarding equipment 2 and the controller, and an IP address of the controller for establishing an SDN/OpenFlow connection may be contained in the DHCP message.

Step 1006: the forwarding equipment 2 establishes the SDN/OpenFlow connection with the controller. Preferably, the forwarding equipment 2 establishes the SDN/OpenFlow connection by virtue of the allocated IP address and the IP address of the controller if the IP address of the controller for establishing the SDN/OpenFlow connection is contained in the DHCP message by the controller or a DHCP server; and the forwarding equipment 2 establishes the SDN/OpenFlow connection by virtue of the allocated IP address and the IP address of the controller contained in the capability attribute which is carried in the extended LLDP message if the IP address of the controller for establishing the SDN/OpenFlow connection is not contained in the DHCP message by the controller or the DHCP server. After establishing the SDN/OpenFlow connection with forwarding equipment 2, the controller directly sends the forwarding rule for forwarding the DHCP discover message and the DHCP request message and/or the forwarding rule for forwarding the OpenFlow protocol message to the forwarding equipment 2. The forwarding equipment 2 sends the extended LLDP message to forwarding equipment connected with an edge of an SDN.

Preferred Implementation 3

Figure 11:
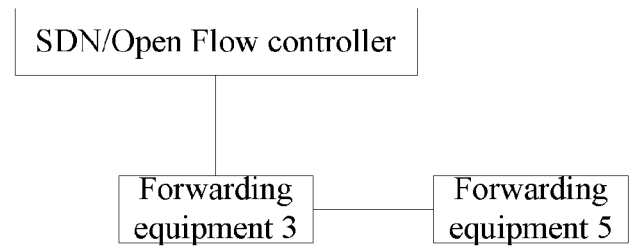
FIG. 11 is a network topology diagram according to preferred implementation III of an embodiment of the present disclosure.
Figure 12:
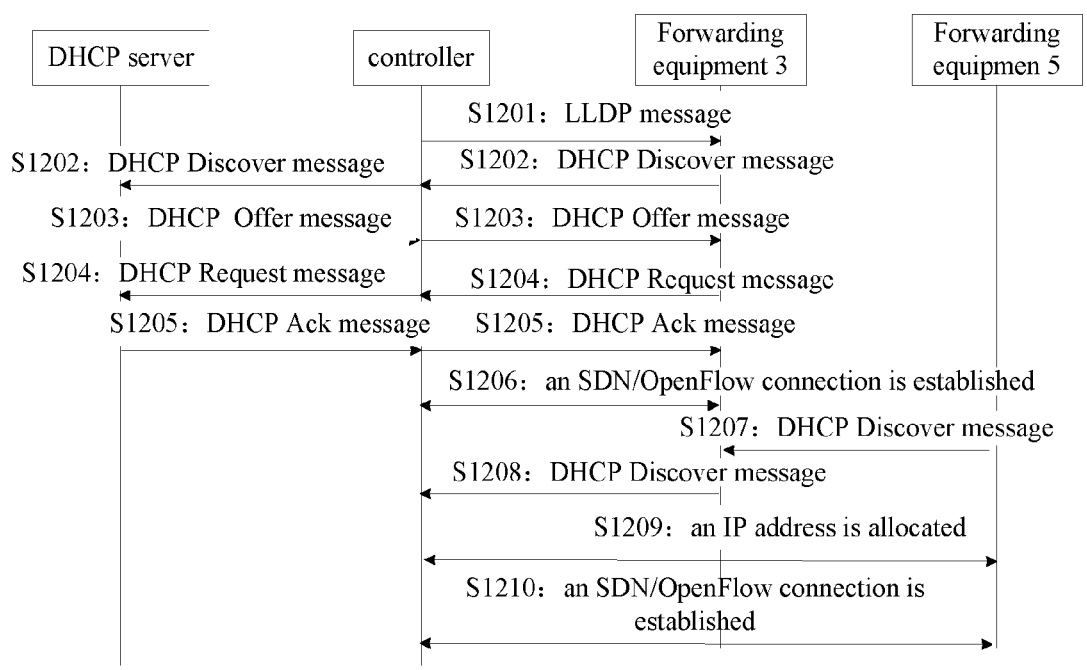
FIG. 12 is a flowchart according to preferred implementation III of an embodiment of the present disclosure.

In a preferred implementation, an SDN/OpenFlow controller is taken as a DHCP relay, and allocates an IP address to forwarding equipment which is directly connected a DHCP server. FIG. 11 is a networking diagram, the controller is the SDN/OpenFlow controller, forwarding equipment 3 is SDN/OpenFlow forwarding equipment, and forwarding equipment 5 is SDN/OpenFlow forwarding equipment which is deployed later. As shown in FIG. 12, the flow specifically includes:

Step 1201: a controller sends an extended LLDP message to forwarding equipment 3, wherein the extended LLDP message contains a plug-and-play capability attribute. Preferably, the controller sends the LLDP message periodically or according to a requirement, and the plug-and-play capability attribute indicates that the controller can provide a function of a DHCP Relay. Preferably, the plug-and-play capability attribute of the SDN/OpenFlow controller may further include a domain name of a management domain to which the equipment belongs to, wherein the domain name is used for implementing domain-based deployment and management of an SDN/OpenFlow network, thereby improving equipment deployment flexibility.

Step 1202: after receiving the LLDP message, the forwarding equipment 3 determines that an IP address for communicating with the controller is not locally allocated, and the forwarding equipment 3 sends a DHCP discover message to the controller. After receiving the DHCP discover message, the controller sends, by using its DHCP relay function, the DHCP discover message to the DHCP server. Preferably, the equipment 3 sends the DHCP discover message via an interface receiving the LLDP message.

Step 1203: after receiving the discover message, the DHCP server sends a DHCP offer message to the controller. After receiving the offer message, the controller, by using the DHCP relay function, sends the DHCP offer message to the forwarding equipment 3.

Step 1204: after receiving the offer message, the forwarding equipment 3 sends a DHCP request message to the controller. After receiving the DHCP request message, the controller sends, by using its DHCP relay function, the DHCP request message to the DHCP server.

Step 1205: the DHCP server sends a DHCP Ack message to the controller after receiving the request message, and the controller sends, by using its DHCP relay function, the DHCP Ack message to the forwarding equipment 3 after receiving the Ack message, thereby finishing allocation of the IP address to the forwarding equipment 3. Preferably, an IP address of the controller for establishing an SDN/OpenFlow connection is contained in the DHCP message, which is interacted between the controller and the forwarding equipment 3, by the controller.

Step 1206: the forwarding equipment establishes the SDN/OpenFlow connection to the controller. Preferably, forwarding equipment 3 establishes the SDN/OpenFlow connection by virtue of the allocated IP address and the IP address of the controller if the IP address of the controller for establishing the SDN/OpenFlow connection is contained in the DHCP message by the controller or the DHCP server. The forwarding equipment 3 establishes the SDN/OpenFlow connection by virtue of the allocated IP address and the IP address of the controller which is contained in the capability attribute of the extended LLDP message if the controller or the DHCP server does not contain the IP address of the controller for establishing the SDN/OpenFlow connection in the DHCP message. Preferably, the controller directly sends a forwarding rule for forwarding the DHCP discover message and the DHCP request message and/or a forwarding rule for forwarding an OpenFlow protocol message to the forwarding equipment 3 after the SDN/OpenFlow connection is established between the forwarding equipment 3 and the controller. The forwarding equipment 3 sends the extended LLDP message to forwarding equipment (for example, forwarding equipment 5) externally connected with an edge of an SDN.

Step 1207: the forwarding equipment 5 accesses the SDN/OpenFlow network through a physical link newly established between the forwarding equipment 5 and the forwarding equipment 3, and then the forwarding equipment 5 sends a DHCP discover message to the forwarding equipment 3.

Step 1208: the forwarding equipment 3 sends the DHCP message to the controller after receiving the DHCP discover message. Preferably, the forwarding equipment 3 forwards the DHCP discover message according to the forwarding rules sent to the forwarding equipment 3 in advance by the controller, or the forwarding equipment 3 forwards the DHCP discover message according to the forwarding rules sent to the forwarding equipment 3 by the controller after requesting the controller for the forwarding rules.

Step 1209: After receiving the DHCP discover message, the controller performs, by using its DHCP Relay, subsequent DHCP message interaction with the forwarding equipment 5 and the DHCP server to implement allocation of an IP address to the forwarding equipment 5, Preferably, the DHCP proxy message interacted between the controller and the forwarding equipment 5 is forwarded through the forwarding equipment 3; and preferably, the controller contains the IP address of the controller for establishing the SDN/OpenFlow connection in the DHCP proxy message.

Step 1210: the forwarding equipment 5 establishes the SDN/OpenFlow connection with the controller. Preferably, the forwarding equipment 5 establishes the SDN/OpenFlow connection by virtue of the allocated IP address and the IP address of the controller if the controller or the DHCP server contains the IP address of the controller for establishing the SDN/OpenFlow connection in the DHCP message; and the forwarding equipment 5 establishes the SDN/OpenFlow connection by virtue of the allocated IP address and the IP address of the controller in the capability attribute of the extended LLDP message if the controller or the DHCP server does not contain the IP address of the controller for establishing the SDN/OpenFlow connection in the DHCP message. Preferably, the controller directly sends the forwarding rule for forwarding the DHCP discover message and the DHCP request message and/or the forwarding rule for forwarding the OpenFlow protocol message to the forwarding equipment 5 after the SDN/OpenFlow connection is established between the controller and the forwarding equipment 5, and the controller sends the extended LLDP message to forwarding equipment externally connected with the edge of the SDN through forwarding equipment 5.

In another embodiment, software is further provided, which is used for executing the technical solutions described in the abovementioned embodiments and preferred implementations.

In another embodiment, a storage medium is further provided, in which the abovementioned software is stored, the storage medium including, but not limited to: a compact disc, a floppy disk, a hard disk, an erasable memory and the like.

From the description above, it can be seen that the embodiments of the present disclosure have technical effects as follows: the first message is used for indicating that the controller sending the first message can provide the reachable path reaching the network address allocation server, and the reachable path indicates that the first equipment can access the network through the controller. The first equipment may learn about that the network may be accessed through the controller after receiving the message, and then the first equipment may send the request message to the controller to request for network address allocation and access the network. In such a manner, the technical problem that equipment unconfigured with a network address may not effectively access the network and network deployment and data forwarding flexibility is lower due to the fact that network addresses of equipment are preconfigured in the related art is solved, and the technical effect that the equipment effectively accesses the network without setting a control plane network is achieved.

Obviously, those skilled in the art should know that each component or step of the present disclosure may be implemented by a universal computing device, and the components or steps can be concentrated on a single computing device or distributed on a network formed by a plurality of computing devices, and may optionally be implemented by programmable codes executable for the computing devices, so that the components or steps may be stored in a storage device for execution with the computing devices, or the shown or described steps may be executed in a sequence different from the sequence here under a certain condition, or the components or steps may form each integrated circuit component, or multiple components or steps therein may form a single integrated circuit component for implementation. As a consequence, the present disclosure is not limited to any specific hardware and software combination.

The above is only the preferred embodiment of the present disclosure and not intended to limit the present disclosure, and for those skilled in the art, the present disclosure may have various modifications and variations. Any modifications, equivalent replacements, improvements and the like within the spirit and principle of the present disclosure shall fall within the scope of protection of the present disclosure.

INDUSTRIAL APPLICABILITY

The technical solutions provided by the embodiment of the present disclosure may be applied to the field of communication, the technical problem that equipment unconfigured with a network address may not effectively access the network and network deployment and data forwarding flexibility is lower due to the fact that network addresses of equipment are preconfigured in the related technology is solved, and the technical effect that the equipment effectively accesses the network without setting a control plane network is achieved.

What is claimed is:

1. A network access method for equipment, comprising:
receiving, by first equipment, a first message, wherein the first message is used for indicating that a controller structuring and sending the first message can provide a reachable path reaching a network address allocation server;
sending, by the first equipment, a first request message to the controller according to the first message, wherein the first request message is used for requesting the controller, or the path-reachable network address allocation server controlled by the controller, or the controller and the path-reachable network address allocation server controlled by the controller to allocate a network address to the first equipment; and
accessing, by the first equipment, the network according to the allocated network address.

2. The method according to claim 1, wherein the first message contains related information of the controller, wherein the related information of the controller comprises at least one piece of the following information: a network address of the controller, an equipment identifier of the controller and a management domain name of the controller.

3. The method according to claim 1, wherein after the network address is allocated to the first equipment, the method further comprises:
establishing, by the first equipment, a connection with the controller; and forwarding, by the first equipment, the first message structured and transmitted by the controller to one or more second equipments directly connected to the first equipment.

4. The method according to claim 3, after forwarding, by the first equipment, the first message structured and transmitted by the controller to the one or more second equipments directly connected to the first equipment, the method further comprises:
  sending, by the second equipment, a second request message to the first equipment according to the first message, wherein the second request message is used for requesting the controller, or the path-reachable network address allocation server controlled by the controller, or the controller and the path-reachable network address allocation server controlled by the controller to allocate a network address to the second equipment; and
  forwarding, by the first equipment, the second request message to the controller.

5. The method according to claim 3, wherein the one or more second equipments are equipment, except equipment which is located in a source direction of the first message, in equipment directly connected with the first equipment.

6. The method according to claim 1, wherein sending, by the first equipment, the first request message to the controller comprises:
  judging, by the first equipment, whether the first equipment has been configured with the network address or not; and
  under the condition that the first equipment has not been configured with the network address, sending, by the first equipment, the first request message to the controller.

7. The method according to claim 1, wherein the controller sends the first message periodically, or the controller generates and sends the first message according to a requirement, or the controller sends the first message periodically and the controller generates and sends the first message according to a requirement.

8. The method according to claim 1, wherein after the first equipment sends the first request message to the controller according to the first message, and acquires the network address, the method further comprises:
  establishing, by the first equipment, a Software Defined Networking (SDN) connection or an OpenFlow connection with the controller according to the allocated network address, wherein the controller comprises: an SDN controller, or an SDN configuration point, or an SDN controller and an SDN configuration point.

9. The method according to claim 8, wherein after establishing, by the first equipment, the SDN connection or the OpenFlow connection with the controller according to the allocated network address, the method further comprises:
  sending, by the controller, an SDN control, or an OpenFlow control message, or an SDN control message message and an OpenFlow control message to the first equipment, wherein the SDN control message, or the OpenFlow control message, or the SDN control message and the OpenFlow control message contain/contains a forwarding rule for forwarding a Dynamic Host Configure Protocol (DHCP) discover message and one of the following message: a DHCP request message, a forwarding rule for forwarding an OpenFlow protocol message, a DHCP request message and a forwarding rule for forwarding an OpenFlow protocol message.

10. The method according to claim 9, wherein sending, by the controller, the SDN control message, or the OpenFlow control message, or the SDN control message and the OpenFlow control message to the first equipment comprises:
  directly sending, by the controller, the SDN control message, or the OpenFlow control message, or the SDN control message and the OpenFlow control message to the first equipment; or
  sending, by the controller, the SDN control message, or the OpenFlow control message, or the SDN control message and the OpenFlow control message to the first equipment after receiving a query message containing the DHCP message from the first equipment.

11. The method according to claim 8, wherein allocating, by the controller, the network address to the first equipment comprises: implementing, by the first equipment and the controller, the allocation of the network address through the DHCP message, wherein the first request message is born in the DHCP message.

12. The method according to claim 11, wherein establishing, by the first equipment, the SDN connection or the OpenFlow connection with the controller according to the allocated network address comprises:
  establishing, by the first equipment, the SDN connection or the OpenFlow connection according to the allocated network address and the network address of the controller under the condition that the network address of the controller, which is used for establishing the SDN connection or the OpenFlow connection in, is contained in the DHCP message by the controller; or
  establishing, by the first equipment, the SDN connection or the OpenFlow connection according to the allocated network address and the network address of the controller which is acquired from the first message under the condition that the network address of the controller for establishing the SDN connection or the OpenFlow connection is not contained in the DHCP message by the controller.

13. The method according to claim 12, wherein allocating, by the controller, the network address to the first equipment comprises:
  the controller performing, by using a DHCP server function, DHCP message interaction with the first equipment to implement the allocation of the network address, wherein the path-reachable network address allocation server comprises: a DHCP server; or
  the controller participating, by using a DHCP relay function, in the DHCP message interaction between the first equipment and the DHCP server to implement the allocation of the network address.

14. The method according to claim 1, wherein the first message comprises: a Link Layer Discovery Protocol (LLDP) message.

15. The method according to claim 1, wherein the first message contains a plug-and-play capability attribute, wherein the capability attribute is used for indicating that the controller can provide the reachable path of the network address allocation server and provide related information of the controller.

16. The method according to claim 15, wherein the capability attribute comprises at least one of the followings: an attribute indicating whether the controller can provide DHCP address allocation or not, an attribute indicating whether the controller can support DHCP relay, the network address of the controller, the equipment identifier of the controller and the management domain name of the controller.

17. A network access device for equipment, wherein the network access device is located in first equipment and comprises a hardware processor, configured to perform programming elements stored in a memory, wherein the programming elements comprise:
- a receiving element configured to receive a first message, wherein the first message is used for indicating that a controller structuring and sending the first message can provide a reachable path reaching a network address allocation server;
- a first sending element configured to send a first request message to the controller according to the first message, wherein the first request message is used for requesting the controller, or the path-reachable network address allocation server controlled by the controller, or the controller and the path-reachable network address allocation server controlled by the controller to allocate a network address to the first equipment; and
- an access element configured to enable the first equipment to access the network according to the allocated network address.

18. The device according to claim 17, the programming elements further comprising:
- a first establishment element configured to establish a connection with the controller; and
- a second sending element configured to forward the first message structured and transmitted by the controller to one or more second equipments directly connected to the first equipment.

19. The device according to claim 17, wherein the first sending element comprises:
- a judgment component configured to judge whether the judgment component has been configured with the network address or not; and
- a sending component configured to, under the condition that the judgment component has not been configured with the network address, send the first request message to the controller.

20. The device according to claim 17, the programming elements further comprising:
- a second establishment element configured to establish a Software Defined Networking (SDN) connection or an OpenFlow connection with the controller according to the allocated network address, wherein the controller comprises: an SDN controller, or an SDN configuration point, or an SDN controller and an SDN configuration point.

* * * * *